United States Patent
Sugiyama et al.

(10) Patent No.: US 6,262,858 B1
(45) Date of Patent: Jul. 17, 2001

(54) MAGNETIC DISK DEVICE FOR CONTROLLING A SENSE CURRENT SUPPLIED TO A MAGNETO-RESISTIVE HEAD BASED ON AN AMBIENT TEMPERATURE

(75) Inventors: Hiroshi Sugiyama, Higashine; Katsumi Kiuchi, Kawasaki, both of (JP)

(73) Assignee: Fujitsu Limited, Kawasaki (JP)

(*) Notice: Subject to any disclaimer, the term of this patent is extended or adjusted under 35 U.S.C. 154(b) by 0 days.

(21) Appl. No.: 09/105,345

(22) Filed: Jun. 26, 1998

(30) Foreign Application Priority Data

Dec. 26, 1997 (JP) .................................................. 9-361172

(51) Int. Cl.$^7$ ........................................................ G11B 5/03
(52) U.S. Cl. ................................... 360/66; 360/75; 360/46
(58) Field of Search ............................... 360/75, 66, 67, 360/46, 113

(56) References Cited

U.S. PATENT DOCUMENTS

| 5,408,365 | * | 4/1995 | Van Doorn et al. | 360/46 |
| 5,455,717 | * | 10/1995 | Van Doorn et al. | 360/6 |
| 5,777,815 | * | 7/1998 | Kasiraj et al. | 360/75 |
| 5,790,334 | * | 8/1998 | Cunningham | 360/66 |
| 5,877,911 | * | 3/1999 | Klaassen et al. | 360/67 |
| 5,978,163 | * | 11/1999 | Cunningham | 360/66 |
| 6,104,563 | * | 8/2000 | Dovek et al. | 360/66 |
| 6,118,610 | * | 9/2000 | Handa | 360/66 |

FOREIGN PATENT DOCUMENTS

| 63-179586 | 7/1988 | (JP) . |
| 4-86577 | 3/1992 | (JP) . |
| 4-223285 | 8/1992 | (JP) . |
| 5-273320 | 10/1993 | (JP) . |
| 6-84116 | 3/1994 | (JP) . |
| 6-162424 | 6/1994 | (JP) . |
| 6-267008 | 9/1994 | (JP) . |
| 7-6309 | 1/1995 | (JP) . |
| 8-293165 | 11/1996 | (JP) . |

* cited by examiner

*Primary Examiner*—David Hudspeth
*Assistant Examiner*—Dan I. Davidson
(74) *Attorney, Agent, or Firm*—Greer, Burns & Crain, Ltd.

(57) ABSTRACT

A magnetic disk device reproduces information from a magnetic disk by using a magneto-resistive head. The magnetic disk device includes a temperature detecting unit which detects an ambient temperature. A sense current control unit controls a sense current based on the ambient temperature detected by the temperature detecting unit, the sense current being supplied to the magneto-resistive head to detect a change of a resistance of the magneto-resistive head for the magnetic disk in a magnetic field.

7 Claims, 12 Drawing Sheets

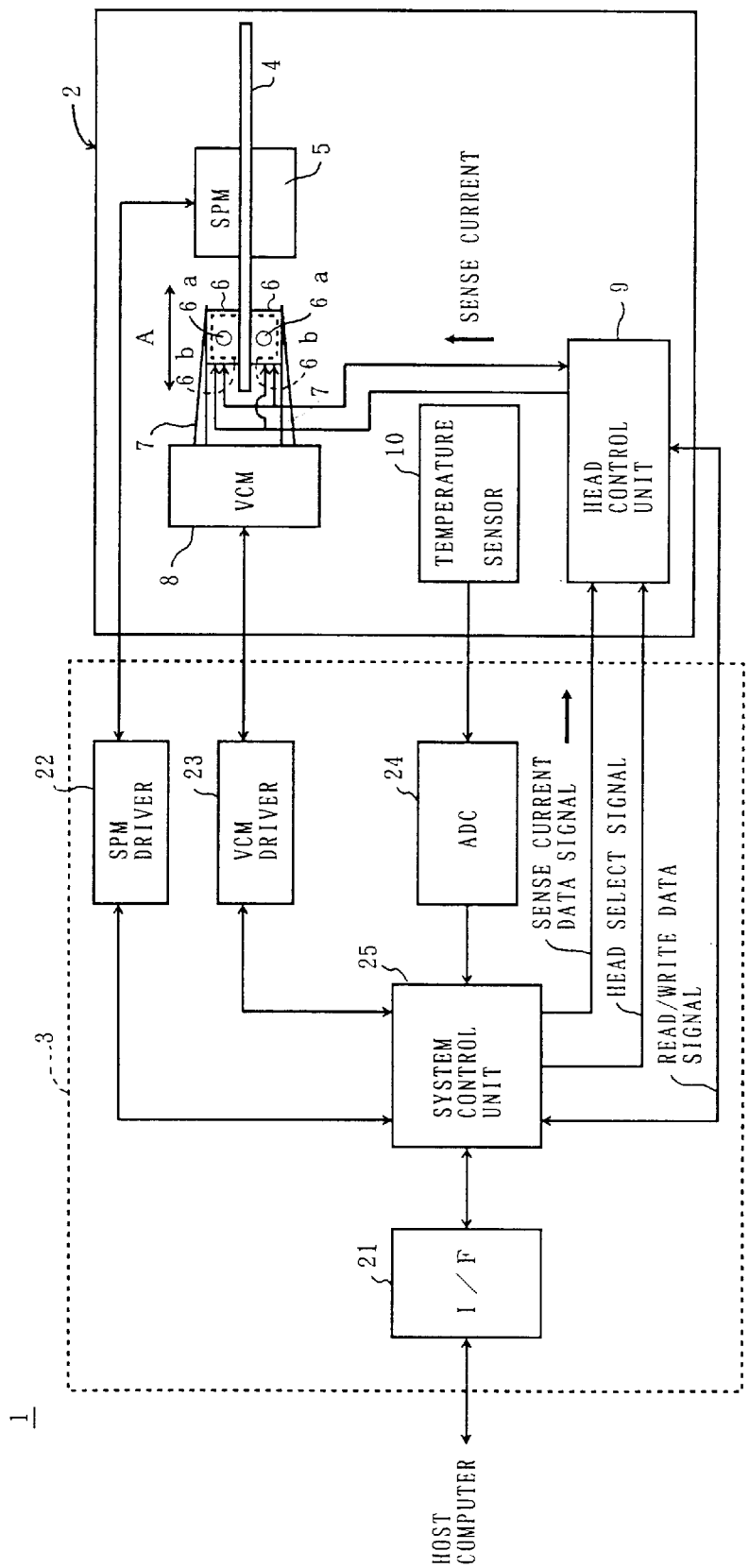
F I G. 1

FIG. 4

| TEMPERATURE | SENSE CURRENT INCREMENT |
|---|---|
| T1 | $dI_{S1}$ |
| T2 | $dI_{S2}$ |
| T3 | $dI_{S3}$ |
| ⋮ | ⋮ |
| Tn | $dI_{Sn}$ |

| HEAD ID | INITIALIZED SENSE CURRENT |
|---------|---------------------------|
| 1 | $I_{S1}$ |
| 2 | $I_{S2}$ |
| 3 | $I_{S3}$ |
| ⋮ | ⋮ |
| m | $I_{Sm}$ |

42

SERIAL DATA ENABLE SIGNAL

SERVO GATE SIGNAL (SG)

INITIALIZED SENSE CURRENT DATA

TEMP-COMPENSATED SENSE CURRENT DATA

MAGNETIC DISK DEVICE FOR CONTROLLING A SENSE CURRENT SUPPLIED TO A MAGNETO-RESISTIVE HEAD BASED ON AN AMBIENT TEMPERATURE

BACKGROUND OF THE INVENTION (1) Field of the Invention

The present invention relates to a magnetic disk device which reproduces information from a magnetic disk by using a magneto-resistive head wherein a sense current is supplied to the head and a change of a resistance of the head for the disk in a magnetic field is detected as a read data signal.

Recently, a magnetic disk device using a magneto-resistive (MR) head to reproduce information from a magnetic disk has been made widely available because the MR head provides a high output level of a read data signal when reading data from the magnetic disk. The MR head has a resistance which varies depending on a magnetic field applied to the magnetic disk. In the magnetic disk device, a sense current is supplied to the MR head as a bias current, and a change of a resistance of the MR head for the disk in the magnetic field is detected as a read data signal. In the magnetic disk device, the sense current supplied to the MR head is predetermined.

In a conventional magnetic disk device of the above type, the sense current supplied to the MR head is predetermined so that given reproduction characteristics of the MR head in a high-temperature operating condition are obtained and a useful life of the MR head in conformity with a given useful life of the magnetic disk device is satisfied.

(2) Description of the Related Art

In a conventional magnetic disk device using the MR head, the sense current supplied to the MR head is predetermined or fixed to a constant level so that the MR head provides given reproduction characteristics in a high-temperature operating condition, in order to allow the MR head to satisfy a useful life of the MR head in conformity with a given useful life of the device.

The sense current which is optimum to be supplied to the MR head varies depending on an operating condition of the MR head. Japanese Laid-Open Patent Application No. 8-293165 which is assigned to the applicant of the present invention discloses an automatic calibration method for a magnetic disk device having a plurality of MR heads. In the automatic calibration method of the above publication, a plurality of initialized sense current values with respect to the plurality of MR heads are predetermined according to the operating condition of each of the MR heads. In order to set the sense current at the optimum level, the sense current supplied to each of the MR heads is predetermined to be set to one of the initialized sense current values depending on the operating condition of each of the MR heads.

However, in the conventional magnetic disk device, the sense current supplied to the MR head is fixed to the initialized sense current value so that the reproduction characteristics of the MR head in the high-temperature operating condition are obtained and the useful life of the MR head in conformity with the desired life of the device is satisfied. Even when the MR head is operating at a room temperature or at low temperatures that are below the room temperature, the sense current supplied to the MR head is fixed to the initialized sense current value. In such a low-temperature operating condition, the sense current which is optimum to be supplied to the MR head is larger than the initialized sense current value. Hence, it is difficult for the conventional magnetic disk device to provide an adequate level of the reproduction characteristics when the MR head is in the low-temperature operating condition.

Further, the conventional magnetic disk device uses a magnetic head including the MR head, and an amount of levitation of the magnetic head from the surface of the magnetic disk becomes large when the magnetic head is operating at low temperatures. The level of the read data signal output by the MR head becomes low due to the increase of the amount of levitation in the low-temperature operating condition, and a read error rate of the conventional magnetic disk device tends to be increased when the MR head is in the low-temperature operating condition. It is difficult for the conventional magnetic disk device to provide an adequate level of the reproduction characteristics when the MR head is in the low-temperature operating condition.

SUMMARY OF THE INVENTION

An object of the present invention is to provide an improved magnetic disk device in which the above-mentioned problems are eliminated.

Another object of the present invention is to provide a magnetic disk device which effectively provides an adequate level of a read data signal output by a magneto-resistive head even when the magneto-resistive head is operating at low temperatures, so that the read error rate is reduced and an assured useful life of the magneto-resistive head is satisfied.

The above-mentioned objects of the present invention are achieved by a magnetic disk device for reproducing information from a magnetic disk by using a magneto-resistive head, which comprises: a temperature detecting unit which detects an ambient temperature; and a sense current control unit which controls a sense current based on the ambient temperature detected by the temperature detecting unit, the sense current being supplied to the magneto-resistive head to detect a change of a resistance of the magneto-resistive head for the disk in a magnetic field.

In the magnetic disk device of the present invention, the sense current control unit which controls the sense current supplied to the magneto-resistive head based on the ambient temperature detected by the temperature detecting unit is provided. It is possible for the magnetic disk device of the present invention to effectively prevent the lowering of the level of the read data signal output by the magneto-resistive head when the magneto-resistive head is operating at low temperatures. A read error rate is remarkably reduced even when the magneto-resistive head is operating at low temperatures. The magnetic disk device of the present invention can satisfy an assured useful life of the magneto-resistive head and provide an adequate level of the reproduction characteristics, regardless of whether the magneto-resistive head is in a high-temperature operating condition or in a low-temperature operating condition.

BRIEF DESCRIPTION OF THE DRAWINGS

The above and other objects, features and advantages of the present invention will become more apparent from the following detailed description when read in conjunction with the accompanying drawings in which:

FIG. 1 is a block diagram of a first embodiment of a magnetic disk device of the present invention;

FIG. 4 is a diagram for explaining a temperature compensation table in the system control unit;

FIG. 5 is a diagram for explaining an initialized sense current table in the system control unit;

DESCRIPTION OF THE PREFERRED EMBODIMENTS

Figure 2:
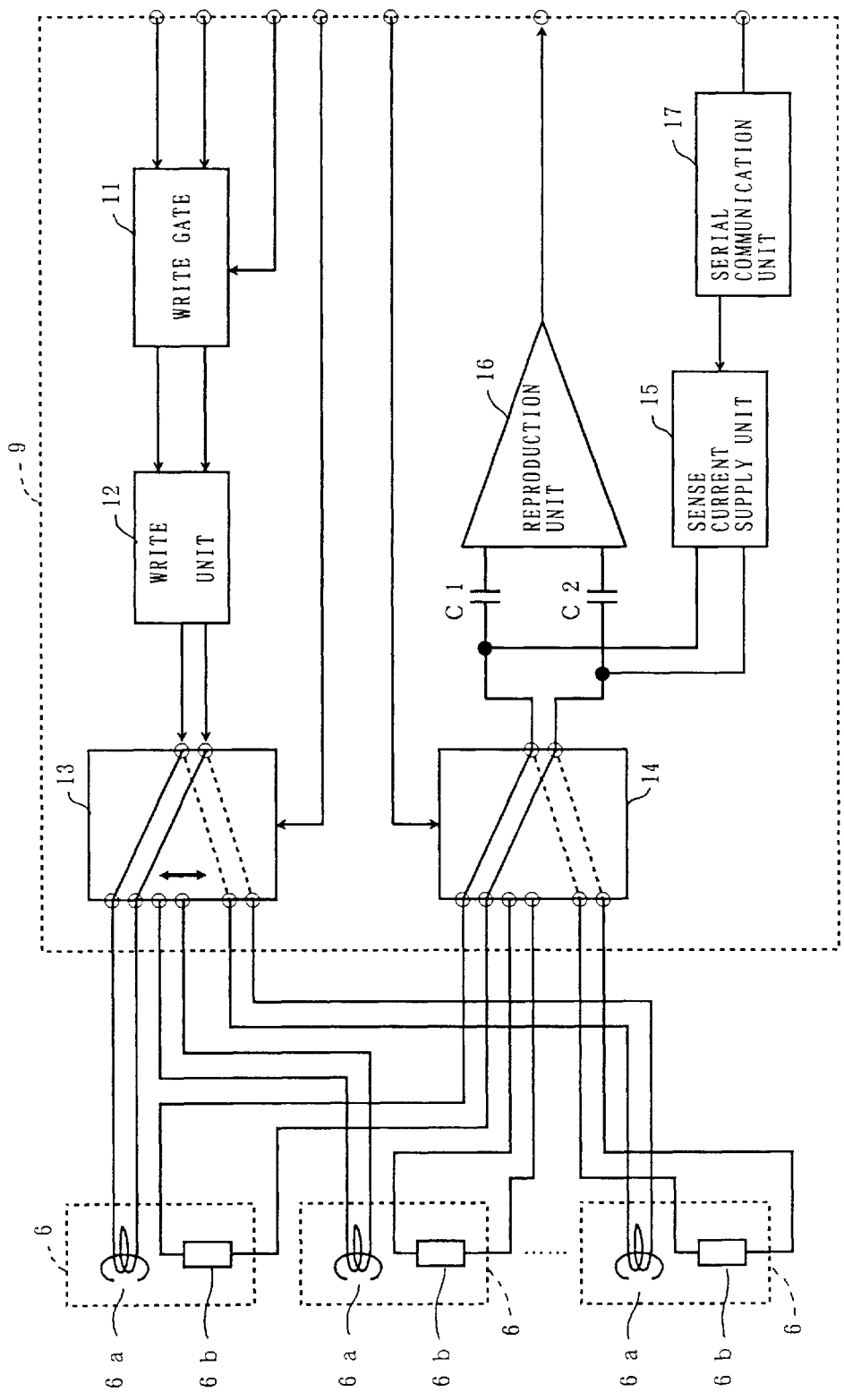
FIG. 2 is a block diagram of a head control unit in the magnetic disk device of the first embodiment.

A description will now be given of the preferred embodiments of the present invention with reference to the accompanying drawings.

FIG. 1 shows a first embodiment of a magnetic disk device of the present invention.

As shown in FIG. 1, the magnetic disk device 1 generally has an enclosure part 2 and a printed-circuit part 3. The enclosure part 2 is a dustproof enclosure which encloses elements of the magnetic disk device 1 therein.

In the enclosure part 2, a magnetic disk 4 which is a recording medium formed with a thin film of a magnetic material on a round plate of an aluminum alloy is provided. The enclosure part 2 includes a spindle motor (SPM) 5 which rotates the magnetic disk 4 around a central axis of the magnetic disk 4. Magnetic heads 6 are provided to confront recording surfaces of the magnetic disk 4, and the magnetic heads 6 read data from and write data to the recording surfaces of the magnetic disk 4 by subjecting the magnetic disk 4 to a magnetic field. Head arms 7 hold the magnetic heads 6 such that the magnetic heads 6 are movable through movement of the head arms 7. A voice coil motor (VCM) 8 is rotated to move the head arms 7 so that the magnetic heads 6 are moved relative to the magnetic disk 4 in a radial direction (indicated by an arrow "A" in FIG. 1) by the movement of the head arms 7. A head control unit 9, which is constituted by an integrated circuit chip, is connected to the magnetic heads 6 and controls read/write operations of the magnetic heads 6 for the magnetic disk 4. A temperature sensor 10 is provided inside the enclosure part 2 in the vicinity of the magnetic heads 6, and detects an ambient temperature in the vicinity of the magnetic heads 6 inside the enclosure part 2. The temperature sensor 10 outputs a signal indicative of the ambient temperature in the vicinity of the magnetic heads 6.

In the magnetic disk device 1 of FIG. 1, only one magnetic head 6 having a set of a write head 6a and a read head 6b is shown, for the sake of convenience of illustration. However, the magnetic heads 6 actually include a plurality of pairs of write heads 6a which are constituted by inductance-type magnetic heads and read heads 6b which are constituted by magneto-resistive (MR) heads, each pair including the write head 6a and the read head 6b. The magnetic disk 4 includes a plurality of recording surfaces. The write heads 6a and the read heads 6b (which will be called the MR heads 6b)are provided to respectively confront the recording surfaces of the magnetic disk 4. The write heads 6a write data to the recording surfaces of the magnetic disk 4. The MR heads 6b read data from the recording surfaces of the magnetic disk 4.

The head control unit 9 amplifies a write data signal output to the magnetic heads 6 (or one of the write heads 6a) and controls a timing to output the write data signal to the magnetic heads 6. Further, the head control unit 9 supplies a sense current to each of the MR heads 6b of the magnetic heads 6 as a bias current, and detects a change of a resistance of each of the MR heads 6b as a read data signal by using the MR heads 6b. The head control unit 9 amplifies the read data signal output by the MR heads 6b.

The head control unit 9 is connected to the printed-circuit part 3, and the printed-circuit part 3 is provided outside the enclosure part 2. The printed-circuit part 3 is connected to a host computer, and the printed-circuit part 3 is controlled in accordance with an internally pre-recorded program of the printed-circuit part 3 by a command from the host computer.

The printed-circuit part 3, as shown in FIG. 1, includes an interface unit (I/F) 21 which provides an interface with the host computer. An SPM driver 22 supplies a drive signal to the spindle motor (SPM) 5 so that the SPM 5 is rotated in accordance with the drive signal. A VCM driver 23 supplies a drive signal to the voice coil motor (VCM) 8 so that the VCM 8 is rotated in accordance with the drive signal. An analog-to-digital converter (ADC) 24 converts an output signal of the temperature sensor 10 into a digital signal indicative of the detected ambient temperature. A system control unit 25 performs modulation of the write data signal and demodulation of the read data signal, controls a sense current supplied to the magnetic heads 6 via the head control unit 9, and performs other control operations. The system control unit 25 supplies a sense current data signal to the head control unit 9. The system control unit 25 supplies a head select signal to the head control unit 9. The system control unit 25 receives a read data signal from the head control unit 9 and supplies a write data signal to the head control unit 9. The above-mentioned elements are provided in the printed-circuit part 3.

FIG. 2 shows a configuration of the head control unit 9 in the magnetic disk device 1.

As shown in FIG. 2, the head control unit 9 includes a write gate 11, a write unit 12 and a switch unit 13. The write gate 11 controls a timing to output the write data signal (supplied from the system control unit 25) to one of the write heads 6a of the magnetic heads 6. The write unit 12 amplifies the write data signal output to the magnetic heads 6. The switch unit 13 selects one of the write heads 6a of the magnetic heads 6 in accordance with the head select signal from the system control unit 23, and supplies the amplified write data signal to the selected one of the write heads 6a.

Further, the head control unit 9 of FIG. 2 includes a switch unit 14, a sense current supply unit 15, a reproduction unit 16 and a serial communication unit 17.

The switch unit 14 selects one of the MR heads 6b of the magnetic heads 6 in accordance with the head select signal from the system control unit 25. The sense current supply unit 15 supplies a sense current to the selected one of the MR heads 6b of the magnetic heads 6 via the switch unit 14. The reproduction unit 16 amplifies a change of the resistance of the selected one of the MR heads 6b of the magnetic heads 6. The reproduction unit 16 supplies the read data signal to the system control unit 25. The reproduction unit 16 has inputs to which capacitors C1 and C2 are respectively connected in series, and the capacitors C1 and C2 serve to inhibit d.c. components of the read data signal from entering the reproduction unit 16.

Further, in the head control unit 9 of FIG. 2, the serial communication unit 17 receives a sense current data signal from the system control unit 25. The serial communication unit 17 supplies a digital signal to the sense current supply unit 15, the digital signal indicating a sense current supplied to each of the MR heads 6b of the magnetic heads 6 in accordance with the sense current data signal from the system control unit 25. The sense current supply unit 15 converts the digital signal, output by the serial communication unit 17, into an analog signal as the sense current supplied to each of the MR heads 6b of the magnetic heads 6. Hence, the sense current supplied to each of the MR heads 6b of the magnetic heads 6 by the sense current supply unit 15 is controlled in accordance with the sense current data signal from the system control unit 25.

Figure 3:
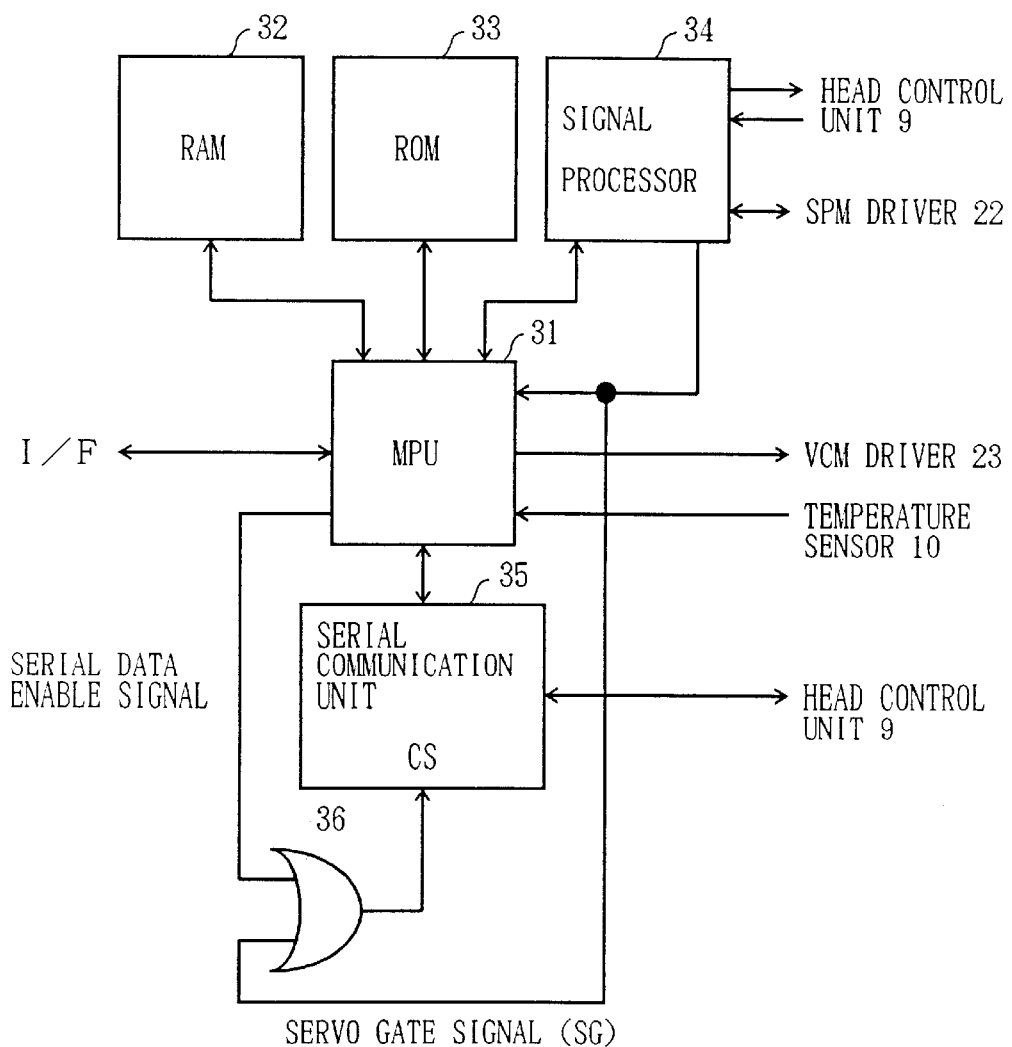
FIG. 3 is a block diagram of a system control unit in the magnetic disk device of the first embodiment.

FIG. 3 shows a configuration of the system control unit 25 in the magnetic disk device 1.

As shown in FIG. 3, the system control unit 25 includes a microprocessor unit (MPU) 31 which controls the operations of the head control unit 9 by executing pre-recorded programs. A random access memory (RAM) 32 provides a working memory used by the MPU 31 when executing one of the pre-recorded programs. A read-only memory (ROM) 33 stores the prerecorded programs executed by the MPU 31 and related parameters used by the MPU 31. A signal processor 34 performs a servo control of the spindle motor (SPM) 5 and performs the write data signal modulation and the read data signal demodulation. A serial communication unit 35 transmits the sense current data signal to the head control unit 9. An OR gate 36 outputs a timing signal to the serial communication unit 35 to control a timing for the serial communication unit 35 to transmit the sense current data signal to the head control unit 9.

Specifically, in the present embodiment, a starting program, an idle process program, a sense current determination process program, a seek process program and a retry process program are stored in the ROM 33. The MPU 31 is booted and the starting program is executed by the MPU 31 when a power switch of the magnetic disk device 1 is turned ON. When the MPU 31 is in a waiting state, the idle process program and the sense current determination process program are executed by the MPU 31. When a seeking operation to locate a desired track of the magnetic disk 4 is performed by the magnetic heads 6, the seek process program is executed by the MPU 31. When a read error has occurred in the magnetic disk device 1, the retry process program is executed by the MPU 31. When the MPU 31 is booted by executing the starting program, the pre-recorded programs and the related parameters are read from the ROM 33 by the MPU 31, and the programs and the related parameters are expanded in the RAM 32.

Alternatively, in the magnetic disk device 1, only the starting program may be stored in the ROM 33 and other programs may be stored in the magnetic disk 4. In such a modification, after the starting program from the ROM 33 is executed, the other programs are read from the magnetic disk 4 and expanded in the RAM 32.

In the system control unit 25 of FIG. 3, a temperature compensation table 41 and an MR-head initialized sense current table 42 are read from the ROM 33 (or from the magnetic disk 4) and expanded in the RAM 32 after the power switch of the magnetic disk device 1 is turned ON. The contents of the temperature compensation table 41 and the contents of the MR-head initialized sense current table 42 in the RAM 32 are accessed by the MPU 31 during a sense current determination process which will be described later.

FIG. 4 shows a temperature compensation table 41 in the system control unit 25 of the present embodiment.

In the temperature compensation table 41, as shown in FIG. 4, a plurality of sense current increments "$dI_{S1}$" through "$dI_{Sn}$" with respect to a plurality of temperatures "T1" through "Tn" are provided. By detecting the ambient temperature based on the output signal of the temperature sensor 10, the MPU 31 is capable of reading out one of the plurality of sense current increments "$dI_{S1}$" through "$dI_{Sn}$" from the temperature compensation table 41 in response to the detected temperature from the temperature sensor 10.

In the magnetic disk device 1 of the present invention, a sense current increment (=dI) which is one of the plurality of sense current increments "$dI_{S1}$" through "$dI_{Sn}$", obtained from the temperature compensation table 41 in response to the detected ambient temperature, is added to initialized sense current values (=I) to produce temperature-compensated sense current values I' (=I+dI).

In the temperature compensation table 41 of the present embodiment, the sense current increments (dI) for low temperatures, which are below a given temperature (for example, a room temperature), are preset to relatively large values such that the temperature-compensated sense current (I') is increased from the initialized sense current (I) but satisfies an assured useful life of the MR heads 6b. On the other hand, the sense current increments for high temperatures, which are above the given temperature, are preset to relatively small values or nearly equal to zero such that the tempereture-compensated sense current (I') is approximately equal to the initialized sense current (I) and satisfies the assured useful life of the MR heads 6b.

FIG. 5 shows an MR-head initialized sense current table 42 in the system control unit 25 of the present embodiment.

In the MR-head initialized sense current table 42, as shown in FIG. 5, a plurality of initialized sense current values "$I_{S1}$" through "$I_{Sm}$" with respect to a plurality of head IDs "1" through "m" (which are used to identify the MR heads 6b of the magnetic heads 6) are provided. In the present embodiment, the initialized sense current values "$I_{S1}$" through "$I_{Sm}$" of the MR-head initialized sense current table 42 are predetermined by using, for example, the automatic calibration method of Japanese Laid-Open Patent Application No. 8-293165.

Figure 6:
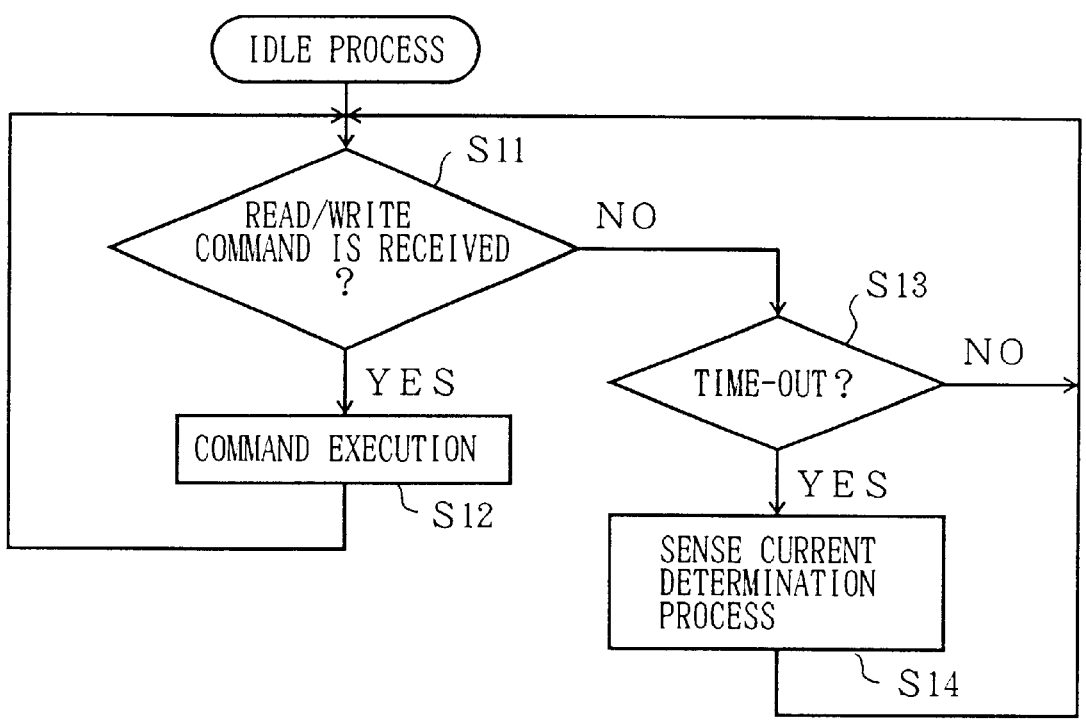
FIG. 6 is a flowchart for explaining an idle process performed by the magnetic disk device of the first embodiment.

FIG. 6 shows an idle process performed by the system control unit 25 of the magnetic disk device 1. The idle process is performed by the system control unit 25 by executing the idle process program stored in the ROM 33.

As shown in FIG. 6, when the idle process is started, the MPU 31 of the system control unit 25 at step S11 detects whether a read/write command issued by the host computer and supplied via the interface unit 21 is received. In the step S11, the MPU 31 is in a waiting state for receiving a read/write command from the host computer.

When the result at the step S11 is affirmative, the MPU 31 at step S12 executes the read/write command from the host computer so that the magnetic heads 6 read data from or write data to the magnetic disk 4. After the step S12 is performed, the control is transferred to the step S11.

When the result at the step S11 is negative, the MPU 31 at step S13 detects whether a given time (for example, 5 minutes) has elapsed since the start of the idle process. When the result at the step S13 is negative, the control is transferred to the step S11. When the result at the step S13 is affirmative, it is determined that a time-out event has occurred. In this case, the MPU 31 at step S14 performs a sense current determination process according to the present invention. In the sense current determination process, temperature-compensated sense current values I'(=I+dI), related to the respective sense currents supplied to the MR heads 6b of the magnetic heads 6, are determined by adding a sense current increment (=dI) to initialized sense current values (=I). After the step S14 is performed, the control is transferred to the step S11.

Figure 7:
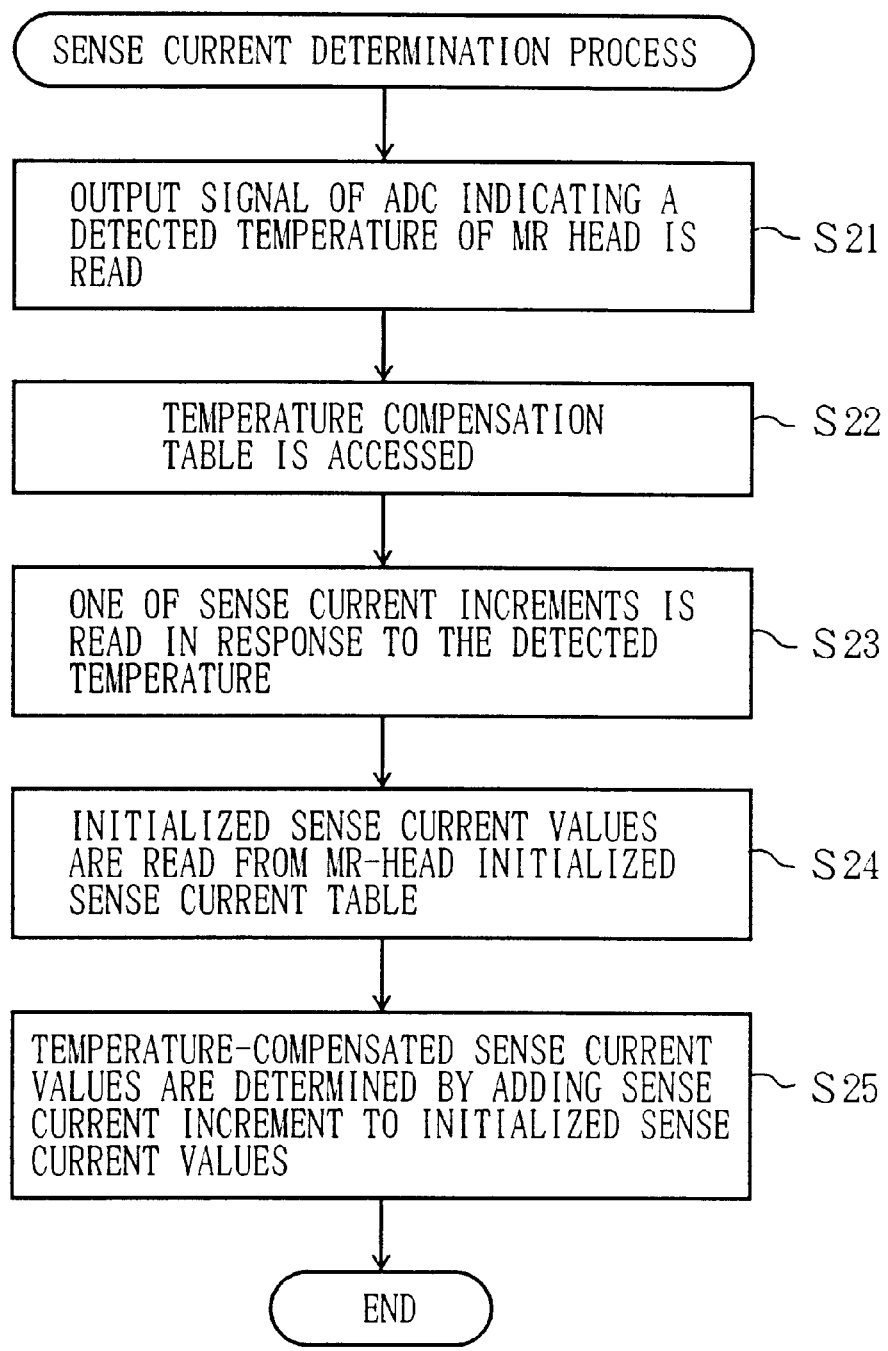
FIG. 7 is a flowchart for explaining a sense current determination process performed by the magnetic disk device of the first embodiment.

FIG. 7 shows a sense current determination process performed by the system control unit 25 of the magnetic disk device 1. The sense current determination process is performed by the system control unit 25 by executing the sense current determination process program in the ROM 33. The sense current determination process of FIG. 7 is started when the step S14 of the idle process of FIG. 6 is performed.

As shown in FIG. 7, when the sense current determination process is started, the MPU 31 of the system control unit 25 at step S21 reads out a digital signal output by the analog-to-digital converter (ADC) 24. The digital signal is indicative of the ambient temperature detected by the temperature sensor 10.

After the step S21 is performed, the MPU 31 at step S22 accesses the contents of the sense current increment table 41 expanded in the RAM 31. The MPU 31 at step S23 reads out one ("$dI_{Sx}$") of the plurality of sense current increments "$dI_{S1}$" through "$dI_{Sn}$" from the temperature compensation table 41 in response to the detected temperature from the temperature sensor 10.

After the step S23 is performed, the MPU 31 at step S24 accesses the contents of the MR-head initialized sense current table 42 expanded in the RAM 31, and reads out the plurality of initialized sense current values "$I_{S1}$" through "$I_{Sm}$" from the MR-head initialized sense current table 42. The initialized sense current values "$I_{S1}$" through "$I_{Sm}$" for the MR heads 6b of the magnetic heads 6 are pre-recorded.

After the step S24 is performed, the MPU 31 at step S25 determines a plurality of temperature-compensated sense current values for the MR heads 6b of the magnetic heads 6 by adding the sense current increment "$dI_{Sx}$" to each of the plurality of initialized sense current values "$I_{S1}$" through "$I_{Sm}$". In the step S25, the plurality of temperature-compensated sense current values "$I_{S1}+dI_{Sx}$" through "$I_{Sm}+dI_{Sx}$" for the MR heads 6b of the magnetic heads 6 are produced.

After the step S25 is performed, the control is transferred to the step S11 of the idle process of FIG. 6. In the present embodiment, the plurality of temperature-compensated sense current values "$I_{S1}+dI_{Sx}$" through "$I_{Sm}+dI_{Sx}$" are produced by the sense current determination process of FIG. 7 every time a time-out event has occurred during the idle process. As described above, in the present embodiment, the sense current increments (dI) in the temperature compensation table 41 of FIG. 4 for low temperatures, below the given temperature, are preset to the relatively large values such that the temperature-compensated sense current (I') is increased from the initialized sense current (I) but satisfies the assured useful life of the MR heads 6b.

The plurality of tempereture-compensated sense current values "$I_{S1}+dI_{Sx}$" through "$I_{Sm}+dI_{Sx}$" which are produced by the sense current determination process of FIG. 7 are used during a seek process (which will be described below) to supply a corresponding sense current to the MR heads 6b of the magnetic heads 6 in accordance with the sense current data signal.

Figure 8:
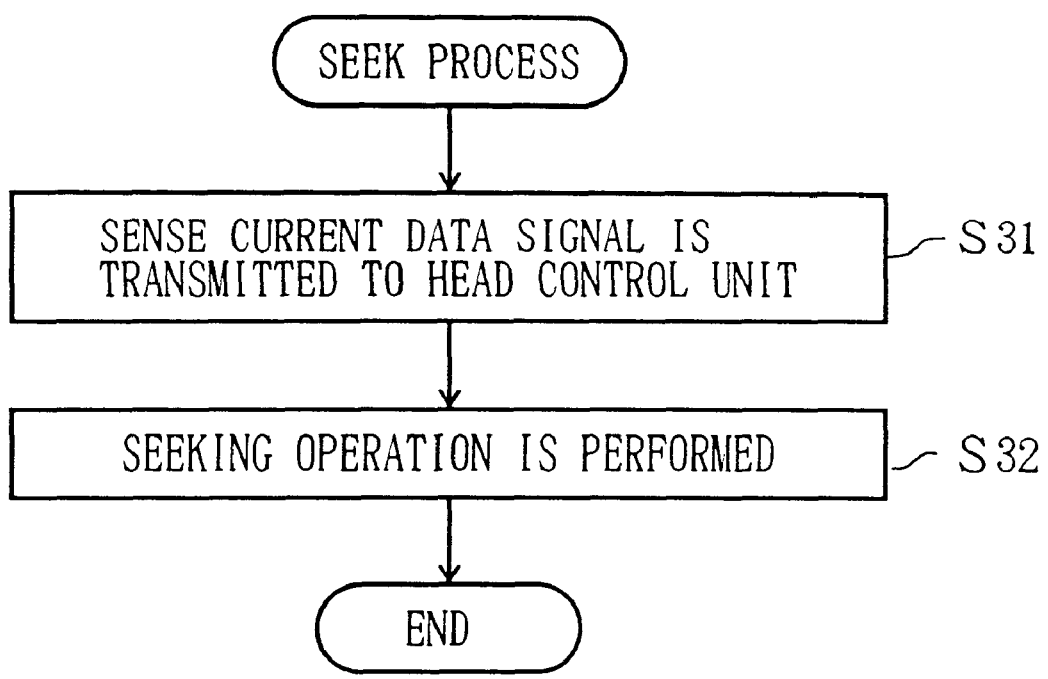
FIG. 8 is a flowchart for explaining a seek process performed by the magnetic disk device of the first embodiment.

FIG. 8 shows a seek process performed by the system control unit 25 of the magnetic disk device 1. The seek process is performed by the system control unit 25 by executing the seek process program stored in the ROM 33. The seek process of FIG. 8 is started when a seek command issued by the host computer and supplied via the interface unit 21 is received by the MPU 31.

As shown in FIG. 8, when the seek process is started, the MPU 31 of the system control unit 25 at step S31 controls the serial communication unit 35 so that the serial communication unit 35 transmits the sense current data signal to the head control unit 9. The sense current data signal is indicative of the plurality of temperature-compensated sense current values "$I_{S1}+dI_{Sx}$" through "$I_{Sm}+dI_{Sx}$" which are produced by the sense current determination process of FIG. 7.

After the step S31 is performed, the MPU 31 at step S32 controls the serial communication unit 35 so that the sense current supply unit 15 supplies a sense current to the selected one of the MR heads 6b of the magnetic heads 6 via the switch unit 14 in accordance with the sense current data signal from the serial communication unit 17. Accordingly, the sense current supplied to each of the MR heads 6b of the magnetic heads 6 by the sense current supply unit 15 is controlled in accordance with the sense current data signal (indicating the temperature-compensated sense current values "$I_{S1}+dI_{Sx}$" through "$I_{Sm}+dI_{Sx}$"). Hence, in the step S32, the seeking operation for the magnetic disk 4 is performed by the magnetic heads 6 with the temperature-compensated sense current under the control of the head control unit 9.

Accordingly, it is possible for the magnetic disk device 1 of the present embodiment to effectively prevent the lowering of the level of the read data signal output by the MR heads 6b due to a low-temperature operating condition. A read error rate is remarkably reduced even when the MR heads 6b are operating at low temperatures. The magnetic disk device 1 of the present embodiment can provide an adequate level of the read data signal and satisfy the assured useful life of the MR heads 6b, regardless of whether the MR heads 6b are in a high-temperature operating condition or in a low-temperature operating condition.

Next, the magnetic disk 4 generally has a servo frame and a data portion. A servo signal is recorded in the servo frame of the magnetic disk 4, and a data signal is recorded in the data portion of the magnetic disk 4. When the servo signal is read from the servo frame of the magnetic disk 4, a tracking servo control is performed by the magnetic heads 6. When the data signal is read from the data portion of the magnetic disk 4, a read data signal is produced by the magnetic heads 6. In order to reliably perform the tracking servo control, a reading frequency of the servo signal is predetermined as being a given frequency that is lower than a reading frequency of the data signal. The tracking servo control is reliably performed by the magnetic heads 6 if the servo signal is safely read from the magnetic disk 4 even though the sense current supplied to the MR heads 6b of the magnetic heads 6 is not increased from the initialized sense current values. The data signal is reliably read from the magnetic disk 4 by the magnetic heads 6 if the tracking servo control can be reliably performed by the magnetic heads 6.

Therefore, when the servo signal is read from the magnetic disk 4 by the magnetic heads 6, the servo signal can be reliably read even though the sense current supplied to the MR heads 6b is the same as the initialized sense current values. Only when the data signal is read from the magnetic disk 4 by the magnetic heads 6, it is necessary that the sense current supplied to the MR heads 6b be increased from the initialized sense current values by the sense current determination process of FIG. 7.

In the magnetic disk device 1 of the first embodiment, when the servo signal is read from the servo frame of the magnetic disk 4 by the magnetic heads 6, the execution of the sense current determination process of FIG. 7 is inhibited, and another sense current determination operation is performed by the system control unit 25. By this sense current determination operation, the sense current supplied to each of the MR heads 6b of the magnetic heads 6 by the sense current supply unit 15 is controlled in accordance with the sense current data signal (indicating the initialized sense current values "$I_{S1}$" through "$I_{Sm}$" of the MR-head initialized sense current table 42). It is possible for the magnetic disk device 1 of the present embodiment to maintain the sense current at the initialized sense current values and satisfy the assured useful life of the MR heads 6b when the servo signal is read from the servo frame of the magnetic disk 4. Only when the data signal is read from the magnetic disk 4 by the magnetic heads 6, the sense current supplied to the MR heads 6b is increased from the initialized sense current values by the sense current determination process of FIG. 7.

FIG. 9A through FIG. 9D show the above-mentioned sense current determination operation of the magnetic disk device 1 when the servo signal is read from the servo frame of the magnetic disk 4.

Figure 9A:
FIG. 9A through FIG. 9D are time charts for explaining an operation of the magnetic disk device of the first embodiment when a servo signal is read from a servo frame of a magnetic disk.
Figure 9B:
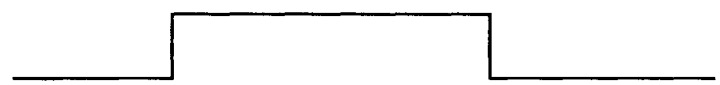
Figure 9C:
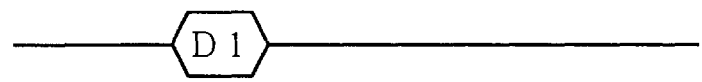
Figure 9D:

FIG. 9A is a time chart of a serial data enable signal (which is shown in FIG. 3) output to the OR gate 36 by the MPU 31. FIG. 9B is a time chart of a servo gate signal (SG) (which is shown in FIG. 3) output to both the MPU 31 and the OR gate 36 by the signal processor 34. FIG. 9C is a time chart of an initialized sense current data signal (D1) output to the head control unit 9 by the serial communication unit 35. FIG. 9D is a time chart of a temperature-compensated sense current data signal (D2) output to the head control unit 9 by the serial communication unit 35.

As shown in FIG. 9B, when the servo signal is read from the servo frame of the magnetic disk 4, the servo gate signal (SG), output to both the MPU 31 and the OR gate 36 by the signal processor 34, is set in an ON state. When a rising edge of the servo gate signal (SG) from the signal processor 34 (or the SG being set in the ON state) is detected, the MPU 31 controls the serial communication unit 35 so that the serial communication unit 35 transmits the sense current data signal (D1) to the head control unit 9. The sense current data signal (D1) indicates the initialized sense current values "$I_{S1}$" through "$I_{Sm}$" of the MR-head initialized sense current table 42. Shortly after the rising edge of the SG, the MPU 31 sets the serial data enable signal output to the OR gate 36 in an OFF state, as shown in FIG. 9A. The serial communication unit 35 is chip-selected by the servo gate signal (SG) output to the serial communication unit 35 through the OR gate 36, and transmits the sense current data signal (D1) to the head control unit 9. At this time, the execution of the sense current determination process of FIG. 7 is inhibited, and the serial communication unit 35 transmits the sense current data signal (D1) to the head control unit 9.

In the head control unit 9, the serial communication unit 17 receives the sense current data signal (D1) from the system control unit 25, and the sense current supply unit 15 supplies the sense current to the MR heads 6b of the magnetic heads 6 in accordance with the initialized sense current values "$I_{S1}$" through "$I_{Sm}$". Therefore, when the servo signal is read from the magnetic disk 4, the magnetic disk device 1 of the present embodiment can maintain the sense current at the initialized sense current values and satisfy the assured useful life of the MR heads 6b.

On the other hand, when a falling edge of the servo gate signal (SG) (or the SG being set in an OFF state) is detected as shown in FIG. 9B, it is determined that the magnetic heads 6 are currently reading out the data signal from the data portion of the magnetic disk 4 to produce a read data signal, not the servo signal from the servo frame of the magnetic disk 4. The MPU 31 controls the serial communication unit 35 so that the serial communication unit 35 transmits the sense current data signal (D2) to the head control unit 9, as shown in FIG. 9D, the sense current data signal (D2) indicating the plurality of temperature-compensated sense current values "$I_{S1}+dI_{Sx}$" through "$I_{Sm}+dI_{Sx}$" by the sense current determination process of FIG. 7. At this time, the MPU 31 sets the serial data enable signal output to the OR gate 36 in an ON state, as shown in FIG. 9A. When the serial data enable signal is set in the ON state, the serial communication unit 35 is chip-selected and transmits the sense current data signal (D2) to the head control unit 9.

In the head control unit 9, the serial communication unit 17 receives the sense current data signal (D2) from the system control unit 25, and the sense current supply unit 15 supplies the sense current to the MR heads 6b of the magnetic heads 6 in accordance with the temperature-compensated sense current values "$I_{S1}+dI_{Sx}$" through "$I_{Sm}+dI_{Sx}$". Therefore, in the magnetic disk device 1 of the present embodiment, only when the data signal is read from the magnetic disk 4 by the magnetic heads 6, the sense current supplied to the MR heads 6b is increased from the initialized sense current values by the sense current determination process of FIG. 7.

Next, in the system control unit 25 of the magnetic disk device 1, the above-described sense current determination process of FIG. 7 is performed during a retry process as well as during the idle process.

Figure 10:
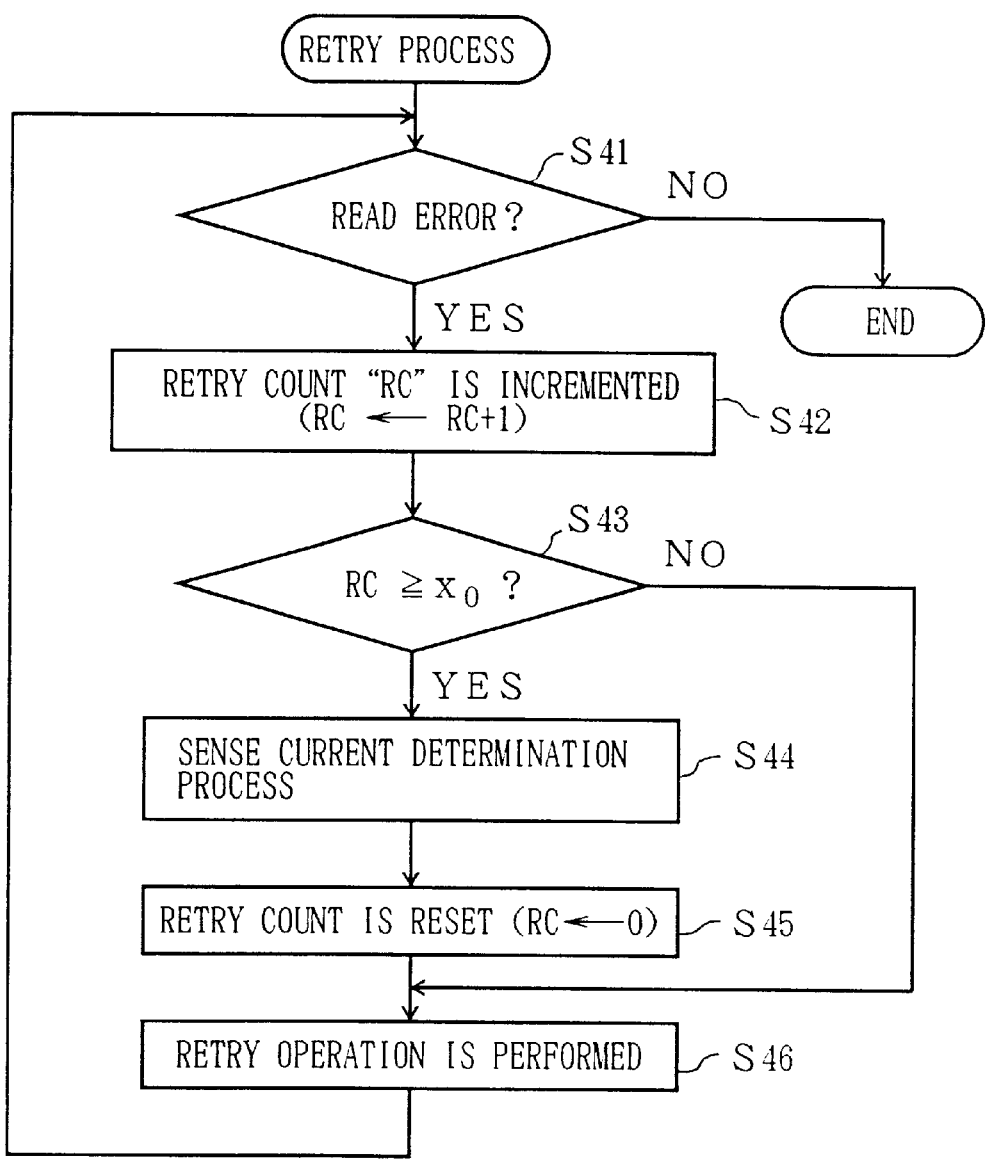
FIG. 10 is a flowchart for explaining a retry process performed by the magnetic disk device of the first embodiment.

FIG. 10 shows a retry process performed by the system control unit 25 of the magnetic disk device 1. The retry process is performed by the MPU 31 of the system control unit 25 by executing the retry process program stored in the ROM 33.

As shown in FIG. 10, when the retry process is started, the MPU 31 of the system control unit 25 at step S41 detects whether a read error has occurred after the magnetic heads 6 read data from the magnetic disk in a previous cycle. In the step S41, the MPU 31 is in a waiting state for receiving a notification of a read error.

When the result at the step S41 is negative, the retry process of FIG. 10 ends without performing subsequent steps.

When the result at the step S41 is affirmative, the MPU 31 at step S42 increments a retry count "RC" (RC←RC+1). After the step S42 is performed, the MPU 31 at step S43 detects whether the retry count "RC" exceeds a predetermined number "Xo" (RC≧Xo).

When the result at the step S43 is affirmative (RC≧Xo), the MPU 31 at step S44 performs the sense current determination process according to the present invention. The step S44 is essentially the same as the sense current determination process of FIG. 7, and a description there of will be omitted.

After the step S44 is performed, the MPU 31 at step S45 resets the retry count "RC" to zero (RC←0). After the step S45 is performed, the MPU 31 at step S46 controls the head control unit 9 through the serial communication unit 35 so that a retry operation for the magnetic disk 4 is performed by the magnetic heads 6 with the tempereture-compensated sense current under the control of the head control unit 9. After the step S46 is performed, the control is transferred to the step S41.

When the result at the step S43 is negative (RC<Xo), the MPU 31 performs the step S46 and does not perform the steps S44 and S45. In this case, the MPU 31 controls the head control unit 9 through the serial communication unit 35 so that a retry operation for the magnetic disk 4 is performed by the magnetic heads 6 with the initialized sense current under the control of the head control unit 9. After the step S46 is performed, the control is transferred to the step S41.

Accordingly, in the system control unit 25 of the magnetic disk device 1, the sense current determination process of FIG. 7 is performed when the retry count exceeds the predetermined number "Xo" (RC≧Xo) during the retry process, as well as during the idle process. Hence, in the present embodiment, when the retry count exceeds the predetermined number (or the read error occurs many times), the sense current determination process of FIG. 7 is performed by taking into consideration the influence of the ambient temperature in the vicinity of the MR heads 6b. By the sense current determination process of FIG. 7, it is possible that a normal reading operation be recovered from the read error. It is possible for the magnetic disk device 1 of the present embodiment to remarkably reduce the read error rate.

The magnetic disk device 1 of the first embodiment includes the temperature sensor 10 provided inside the enclosure part 2, and the temperature sensor 10 detects an ambient temperature in the vicinity of the magnetic heads 6. In another embodiment of the magnetic disk device of the present invention, a temperature of the magnetic heads 6 in the operating condition can be determined by obtaining a change of resistance of one of the MR heads 6b of the magnetic heads 6.

Figure 11:
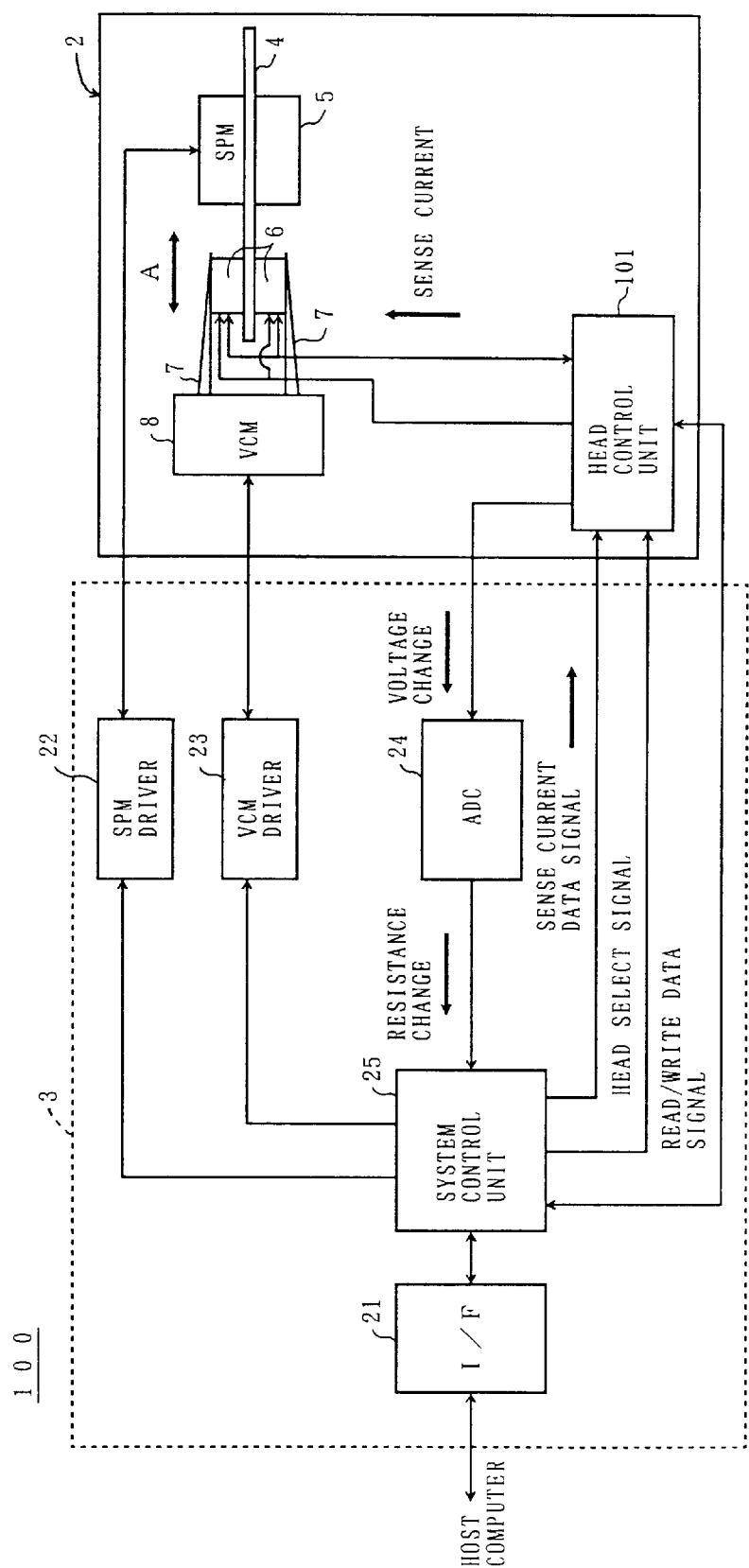
FIG. 11 is a block diagram of a second embodiment of the magnetic disk device of the present invention.

FIG. 11 shows a second embodiment of the magnetic disk device of the present invention. In FIG. 11, the elements which are the same as corresponding elements in FIG. 1 are designated by the same reference numerals, and a description thereof will be omitted.

As shown in FIG. 11, the magnetic disk device 100 generally has the enclosure part 2 and the printed-circuit part 3. In the enclosure part 2, a head control unit 101 which is constituted by an integrated circuit chip is provided, instead of the head control unit 9 shown in FIG. 1. The head control unit 101 is connected to the magnetic heads 6 and controls read/write operations of the magnetic heads 6 for the magnetic disk 4. The temperature sensor 10 shown in FIG. 1 is not provided in the enclosure part 2. Other elements of the magnetic disk device 100 shown in FIG. 11 are the same as corresponding elements of the magnetic disk device 1.

In the magnetic disk device 100 of FIG. 11, the head control unit 101 supplies a given sense current ($I_{s0}$) to a particular one of the plurality of the MR heads 6b of the magnetic heads 6, and receives a change of d.c. voltage produced in the particular one of the plurality of the MR heads 6b of the magnetic heads 6 in response to the given sense current ($I_{s0}$). The head control unit 101 supplies an analog signal indicating the change of the d.c. voltage output by the MR head 6b (or the particular one of the MR heads 6b of the magnetic heads 6), to the analog-to-digital converter (ADC) 24 of the printed-circuit part 3.

In the printed-circuit part 3 of FIG. 11, the ADC 24 converts the analog signal indicating the voltage change of the MR head 6b into a digital signal indicating a change of resistance of the MR head 6b. The ADC 24 outputs the digital signal to the system control unit 25. Hence, the system control unit 25 of the present embodiment is capable of determining a temperature of the MR head 6b based on the digital signal output by the ADC 24.

Similar to the first embodiment of FIG. 1, the MPU 31 of the present embodiment is capable of reading out one of the plurality of sense current increments "$dI_{S1}$" through "$dI_{Sn}$" from the temperature compensation table 41 in response to the determined temperature. In the system control unit 25 of the present embodiment, a sense current increment (=dI) which is one of the plurality of sense current increments "$dI_{S1}$" through "$dI_{Sn}$" is added to the initialized sense current values (=I) to produce temperature-compensated sense current values I'(=I+dI), which will be described later.

Figure 12:
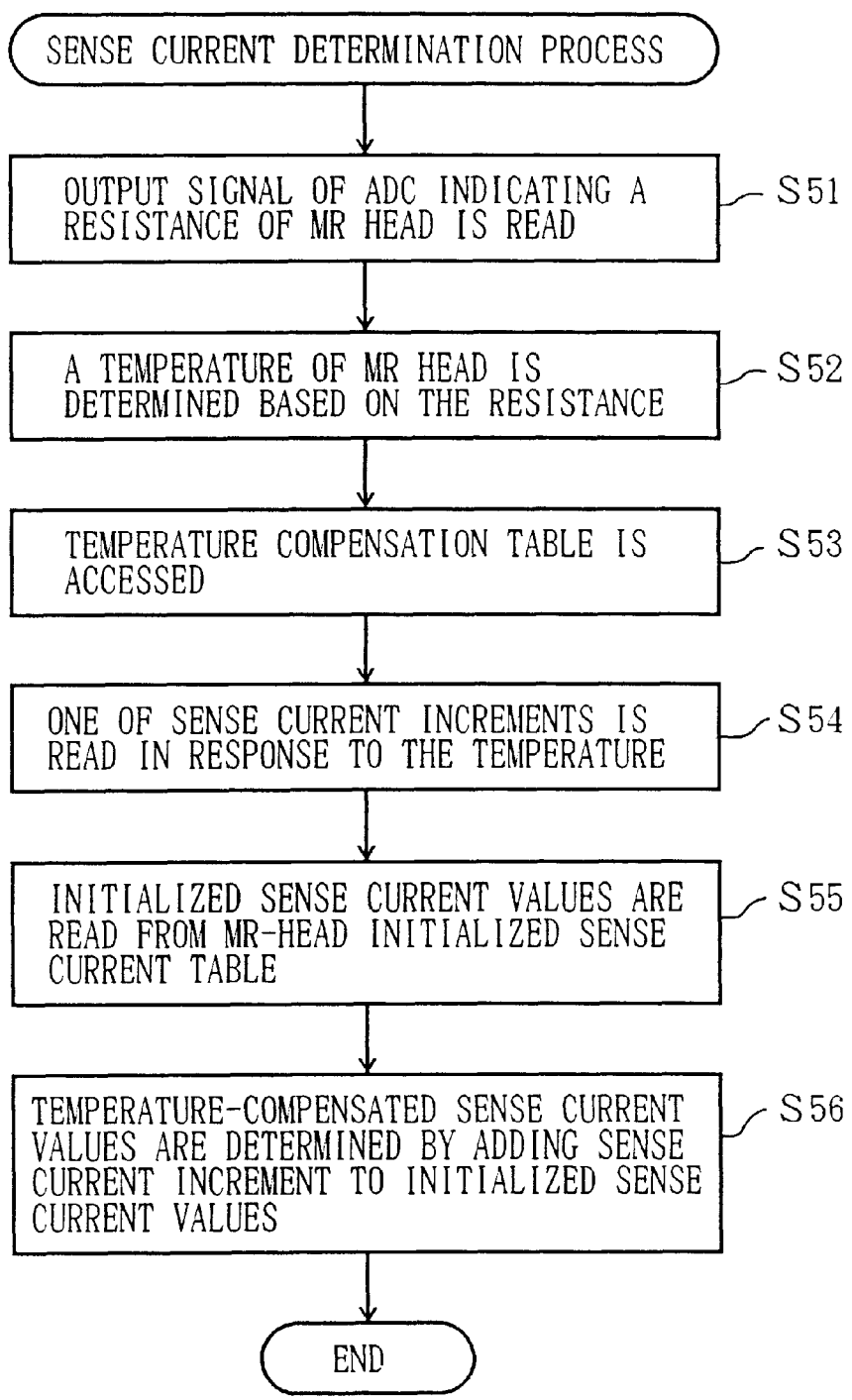
FIG. 12 is a flowchart for explaining a sense current determination process performed by the magnetic disk device of the second embodiment.

FIG. 12 shows a sense current determination process performed by the system control unit 25 of the magnetic disk device 100.

Similar to the sense current determination process of FIG. 7, the sense current determination process of the present embodiment is performed by the system control unit 25 by executing a sense current determination process program in the ROM 33.

In the magnetic disk device 100 of the present embodiment, the head control unit 101 supplies a given sense current $I_{s0}$ to one of the plurality of the MR heads 6b of the magnetic heads 6, and receives a change of d.c. voltage produced in the MR head 6b for the given sense current $I_{s0}$. The head control unit 101 supplies an analog signal indicating the voltage change of the MR head 6b to the ADC 24 of the printed-circuit part 3. Since the given sense current $I_{s0}$ is supplied to the MR head 6b, the voltage change output to the head control unit 101 by the MR head 6b is proportional to a change of resistance of the MR head 6b. The change of resistance of the MR head 6b varies depending on the temperature of the MR head 6b in the magnetic heads 6.

The ADC 24 converts the analog signal indicating the voltage change of the MR head 6b into a digital signal, and the digital signal indicates a change of resistance of the MR head 6b. The ADC 24 outputs the digital signal to the MPU 31 of the system control unit 25. Hence, the MPU 31 is capable of determining a temperature of the MR head 6b based on the output signal of the ADC 24.

As shown in FIG. 12, the MPU 31 at step S51 reads out a digital signal output by the analog-to-digital converter (ADC) 24. After the step S51 is performed, the MPU 31 at step S52 determines a temperature of the MR head 6b based on the digital signal output by the ADC 24.

The determination of the temperature of the MR head 6b based on the digital signal output by the ADC 24 is performed by the MPU 31 at the step S52, as follows.

Generally, a resistance MRR2 of the MR head 6b (or a particular one of the MR heads 6b of the magnetic heads 6) at a certain temperature when the MR head 6b is operating is represented by the following formula:

$$MRR2 = MRR1\{1 + \alpha(T2 - T1)\} \qquad (1)$$

where: $\alpha$ is a temperature coefficient of resistance of the MR head 6b; T1 is a room temperature; T2 is a current temperature at which the MR head 6b is currently operating; and MRR1 is an initialized resistance of the MR head 6b at the room temperature T1. The initialized resistance MRR1 is originally set at the room temperature T1 during an inspection before delivery of the magnetic disk device.

From the above formula (1), the temperature T2 in the current operating condition of the MR head 6b can be calculated if the resistance MRR2 is given from the digital signal of the ADC 24, as follows:

$$T2=\{MRR2+MRR1(\alpha T1-1)\}/\alpha MRR1 \tag{2}$$

The above formula (2) is defined in the sense current determination process program stored in the ROM 33. The resistance MRR2 of the MR head 6b in the current operating condition is obtained from the digital signal output by the ADC 24. Hence, at the step S52, the MPU 31 is capable of determining the temperature (T2) of the MR head 6b based on the digital signal (MRR2) output by the ADC 24.

After the step S52 is performed, the MPU 31 at step S53 accesses the contents of the sense current increment table 41 expanded in the RAM 31. Similar to the first embodiment of FIG. 1, in the system control unit 25 of the present embodiment, the temperature compensation table 41 of FIG. 4 and the MR-head initialized sense current table 42 of FIG. 5 are read from the ROM 33 (or from the magnetic disk 4) and expanded in the RAM 32 after a power switch of the magnetic disk device 100 is turned ON.

After the step S53 is performed, the MPU 31 at step S54 reads out one ("$dI_{Sx}$") of the plurality of sense current increments "$dI_{S1}$" through "$dI_{Sn}$" from the temperature compensation table 41 in response to the determined temperature (T2). In the system control unit 25 of the present embodiment, a sense current increment (=dI) which is one of the plurality of sense current increments "$dI_{S1}$" through "$dI_{Sn}$" is added to initialized sense current values (=I) to produce temperature-compensated sense current values I'(=I+dI).

After the step S54 is performed, the MPU 31 at step S55 accesses the contents of the MR-head initialized sense current table 42 in the RAM 31, and reads out the plurality of initialized sense current values "$I_{S1}$" through "$I_{Sm}$" from the MR-head initialized sense current table 42. The initialized sense current values "$I_{S1}$" through "$I_{Sm}$" for the MR heads 6b of the magnetic heads 6 are pre-recorded in the MR-head initialized sense current table 42.

After the step S55 is performed, the MPU 31 at step S56 determines a plurality of temperature-compensated sense current values, related to the respective sense currents supplied to the MR heads 6b of the magnetic heads 6, by adding the sense current increment "$dI_{Sx}$" to each of the plurality of initialized sense current values "$I_{S1}$" through "$I_{Sm}$". In the step S56, the plurality of tempereture-compensated sense current values "$I_{S1}+dI_{Sx}$" through "$I_{Sm}+dI_{Sx}$" for the MR heads 6b of the magnetic heads 6 are produced.

After the step S56 is performed, the sense current determination process of FIG. 12 ends. For example, the plurality of temperature-compensated sense current values "$I_{S1}+dI_{Sx}$" through "$I_{Sm}+dI_{Sx}$" are produced by the sense current determination process of FIG. 12 every time a time-out event has occurred during an idle process similar to the idle process of FIG. 6. As described above, in the present embodiment, the sense current increments (dI) in the temperature compensation table 41 of FIG. 4 for low temperatures, below a given temperature (for example, a room temperature), are preset to the relatively large values such that the temperature-compensated sense current (I') is increased from the initialized sense current (I) but satisfies the assured useful life of the MR heads 6b.

The plurality of tempereture-compensated sense current values "$I_{S1}+dI_{Sx}$" through "$I_{Sm}+dI_{Sx}$" which are produced by the sense current determination process of FIG. 12 are used during a seek process to supply a corresponding sense current to the MR heads 6b of the magnetic heads 6 in accordance with the sense current data signal.

Accordingly, it is possible for the magnetic disk device 100 of the second embodiment to effectively prevent the lowering of the level of the read data signal output by the MR heads 6b due to a low-temperature operating condition. A read error rate is remarkably reduced even when the MR heads 6b are operating at low temperatures. The magnetic disk device 100 of the present embodiment can provide an adequate level of the read data signal and satisfy the assured useful life of the MR heads 6b, regardless of whether the MR heads 6b are in a high-temperature operating condition or in a low-temperature operating condition.

Further, the present invention is not limited to the above-described embodiments, and variations and modifications may be made without departing from the scope of the present invention.

The present invention is based on Japanese patent application No. 9-361172, filed on Dec. 26, 1997, the entire contents of which are hereby incorporated by reference.

What is claimed is:

1. A magnetic disk device for reproducing information from a magnetic disk by using a magneto-resistive (MR) head, comprising:

a temperature detecting unit for detecting an ambient temperature; and a sense current control unit for controlling a sense current based on said ambient temperature detected by said temperature detecting unit, said sense current being supplied to the magneto-resistive head to detect a change of a resistance of the magneto-resistive head depending on a magnetic field applied to the disk, wherein said temperature detecting unit detects the ambient temperature based on a room temperature, an initialized resistance of the MR head at the room temperature when the MR head is supplied a given sense current, a resistance of the MR head at the ambient temperature when the MR head is supplied the given sense current, and a formula defining the relationship between the change in resistance of an MR head supplied a given sense current and a change in ambient temperature.

2. The magnetic disk device according to claim 1, wherein the sense current control unit determines a temperature-compensated sense current such that the temperature-compensated sense current is increased from an initialized sense current when the detected ambient temperature is below a given temperature.

3. The magnetic disk device according to claim 1, wherein the sense current control unit includes a temperature compensation table in which a plurality of sense current increments with respect to a plurality of ambient temperatures are recorded, and the sense current control unit reads out one of the plurality of sense current increments from the temperature compensation table in response to the ambient temperature detected by the temperature detecting unit.

4. The magnetic disk device according to claim 1, wherein the sense current control unit determines a temperature-compensated sense current based on the detected ambient temperature, and supplies the temperature-compensated sense current to the magneto-resistive head every time a given time has elapsed.

5. The magnetic disk device according to claim 1, wherein the sense current control unit determines a temperature-compensated sense current based on the detected ambient temperature and supplies the temperature-compensated sense current to the magneto-resistive head when a retry count exceeds a predetermined number, the retry count being incremented every time a read error occurs.

6. A magnetic disk device for reproducing information from a magnetic disk by using a magneto-resistive head, comprising:

a temperature detecting unit for detecting an ambient temperature; and a sense current control unit for controlling a sense current based on said ambient temperature detected by said temperature detecting unit, said sense current being supplied to the magneto-resistive head to detect a change of a resistance of the magneto-resistive head for the disk in a magnetic field, wherein the magnetic disk includes a servo frame in which a servo signal is recorded, and said sense current control unit maintains said sense current supplied to the magneto-resistive head at an initialized sense current irrespective of said ambient temperature detected by said temperature detecting unit when said servo signal is read from said servo frame of the magnetic disk.

7. A magnetic disk device for reproducing information from a magnetic disk by using a magneto-resistive head, comprising:

a temperature detecting unit for detecting an ambient temperature (T2); and a sense current control unit for controlling a sense current based on said ambient temperature detected by said temperature detecting unit, said sense current being supplied to the magneto-resistive head to detect a change of a resistance of the magneto-resistive head depending on a magnetic field applied to the disk, wherein said temperature detecting unit detects the ambient temperature T2 based on a resistance MRR2, which is the resistance of the magneto-resistive head at said temperature T2 obtained for a given sense current supplied to the magneto-resistive head, in accordance with a formula:

$$T2=\{MRR2+MRR1(\alpha T1-1)\}/\alpha MRR1$$

where $\alpha$ is a temperature coefficient of resistance of the magneto-resistive head; T1 is room temperature; and MRR1 is an initialized resistance of the magneto-resistive head when supplied the given sense current at said room temperature T1.

* * * * *